US011326553B2

(12) United States Patent
Todorovic (10) Patent No.: US 11,326,553 B2
(45) Date of Patent: May 10, 2022

(54) EXHAUST NOZZLE OF A GAS TURBINE ENGINE

(71) Applicant: Rolls-Royce Deutschland Ltd & Co KG, Blankenfelde-Mahlow (DE)

(72) Inventor: Predrag Todorovic, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 229 days.

(21) Appl. No.: 16/719,023

(22) Filed: Dec. 18, 2019

(65) Prior Publication Data
US 2021/0190003 A1    Jun. 24, 2021

(51) Int. Cl.
*F02K 1/54*    (2006.01)
(52) U.S. Cl.
CPC ............ *F02K 1/54* (2013.01); *F05D 2220/32* (2013.01)
(58) Field of Classification Search
CPC .................................. F02K 1/54; F02K 1/763
USPC ......................................................... 415/181
See application file for complete search history.

(56) References Cited

U.S. PATENT DOCUMENTS

2015/0016965 A1*   1/2015   Sawyers-Abbott ..... F02K 1/763
                                                            415/148

FOREIGN PATENT DOCUMENTS

DE         102017130563 A1     6/2019

* cited by examiner

*Primary Examiner* — Michael L Sehn
(74) *Attorney, Agent, or Firm* — Shuttleworth & Ingersoll, PLC; Timothy J. Klima (57) ABSTRACT

Aspects of the disclosure regard an exhaust nozzle of a gas turbine engine which includes an outer nozzle wall, a flow channel, a centerbody arranged in the flow channel, at least two struts connecting the centerbody to the nozzle wall, a thrust reverser unit, and a plurality of actuators, wherein each actuator is associated with a strut for displacing the strut in the axial direction. The struts are connected to a structure of the outer nozzle wall that forms part of the thrust reverser unit. For allowing axial relative movement between the struts and the outer nozzle wall, each strut includes a sliding element extending radially from the radial outer end of the strut, wherein the sliding element is arranged in a receiving slot that extends in the axial direction in the nozzle wall. It is provided that the sliding element comprises an interaction structure that interacts with one of the actuators for effecting relative axial movement between the strut and the nozzle wall.

20 Claims, 7 Drawing Sheets

EXHAUST NOZZLE OF A GAS TURBINE ENGINE

The present disclosure relates to an exhaust nozzle of a gas turbine engine.

It is known to provide for a variable area exhaust nozzle that comprises an outer nozzle wall and a centerbody that is displaceable in the axial direction relative to the outer nozzle wall. Document DE 10 2017 130 563 A1 describes an exhaust nozzle of a turbofan engine that comprises a centerbody which is connected by means of struts to an outer nozzle wall. To move the centerbody in the axial direction, the struts are axially displaceable relative to the nozzle wall. The respective adjustment means require radial space within the outer nozzle wall which may increase the overall wall thickness.

There is a need to provide for a variable area nozzle of a gas turbine engine that comprises a movable centerbody that is connected to the outer nozzle wall in an effective manner that saves radial space within the outer nozzle wall.

According to an aspect of the invention, an exhaust nozzle for a gas turbine engine is provided, wherein the exhaust nozzle comprises an outer nozzle wall, a flow channel which is limited radially outwards by the nozzle wall, a centerbody arranged in the flow channel, at least two struts connecting the centerbody to the nozzle wall, a thrust reverser unit, and a plurality of actuators, wherein each actuator is associated with a strut for displacing the strut in the axial direction. The struts are connected to a structure of the outer nozzle wall that forms part of the thrust reverser unit. For allowing axial relative movement between the struts and the outer nozzle wall, each strut comprises a sliding element extending radially from the radial outer end of the strut, wherein the sliding element is arranged in a receiving slot that extends in the axial direction in the nozzle wall. The sliding element comprises an interaction structure that interacts with one of the actuators for effecting relative axial movement between the strut and the nozzle wall.

Aspects of the invention are thus based on the idea to integrate a sliding element that allows to move the struts in the axial direction and an interaction structure that interacts with an associated actuator for effecting the axial movement. Further, connection of the strut to the nozzle wall is with a structure of a thrust reverser unit.

The feature that the struts are connected to a structure of the outer nozzle wall that forms part of the thrust reverser unit includes that the struts are connected to a fixed structure of the thrust reverser unit that serves to support pivot doors of the trust reverser unit such as side beams of the outer nozzle wall that comprise hinges or lugs for the pivot doors.

In an embodiment, a toothing is integrated into the sliding element as interaction structure, wherein the actuator interacts with the toothing for axial movement of the strut. The toothing may form a toothed rack in the sliding element. In an embodiment, such toothed rack may comprise teeth formed substantially in the circumferential direction.

The actuator may comprise a worm screw that interacts with the toothing of the sliding element. In such case, the actuator and the toothing of the sliding element form a worm and rack drive.

In a further embodiment, the sliding element comprises a radial outer section, wherein the toothing is formed in the radial outer section of the sliding element. For example, the radial outer section of the sliding element is formed as a cylinder, wherein the toothing is formed in the radial outer side of the cylinder (i.e., the half of the cylinder radially outwards with respect to the engine centerline).

In an embodiment, the sliding element and the receiving slot comprise, in cross section, corresponding keyhole shapes that may provide for a form-fit in the radial and circumferential directions (wherein the cross-section of the keyhole shape of the sliding element is smaller than the cross-section of the keyhole shape of receiving slot). For example, the sliding element and the receiving slot may both comprise a circular cross-section. In another example, the first sliding element and the first receiving slot may form a dovetail-connection.

According to a further embodiment, the structure of the outer nozzle wall that forms part of the thrust reverser unit and to which the struts are connected comprises beams, wherein at least a part of each actuator is located at a respective beam. In embodiments, all parts of an actuator such as a motor, a driving rod and a worm screw are located at least in sections at such beam of the nozzle wall structure. Such arrangement is particularly space-saving and further reduces the radial space required to arrange the actuator and have it interact with the sliding element.

The feature that at least a part of each actuator is located "at" a respective beam includes that such actuator part is arranged at a wall of the side beam or at least partly in a space within the beam defined by walls of the beam.

In an embodiment, the receiving slot is formed by a wall section of such beam, such as a convexly formed wall section. Accordingly, the receiving slot, the sliding element arranged in the reveiving slot, and the actuation mechanism are integrated into the thrust reverser unit, namely, the side beam of the outer nozzle wall that forms part of the thrust reverser unit.

In an embodiment, the beam comprises a wall and a slot in the wall, wherein an interacting element of the actuator and/or an interacting element of the sliding element protrudes through the slot in the beam wall for interaction between the actuator and the sliding element. Such embodiment allows to place the interacting elements of the actuator and the sliding element at close radial distance even though a beam wall is located in between them.

In an embodiment, a toothing is integrated into the sliding element as interaction structure, wherein the actuator comprises a worm screw and wherein the worm screw protrudes through the slot in the beam wall to interact with the toothing of the sliding element. In such embodiment, the slot can be of small size and easily/automatically sealed by design.

In another embodiment, the interaction structure is formed by lugs protruding from the sliding element through the slot into the beam, wherein the actuator is a linear actuator, and wherein the lugs are connected to the linear actuator. In such embodiment, the slot is an axial slot which needs to be sealed to reduce air leakage from the nozzle. The linear actuator may be an electric, pneumatic or hydraulic linear actuator.

In an embodiment, the thrust reverser unit comprises pivot doors which block the flow channel through the nozzle when the thrust reverser unit is activated, wherein the pivot doors are hinged to the structure of the outer nozzle wall that forms part of the thrust reverser unit. In particular, the pivot doors may be hinged to the beams that integrate the actuators, thereby achieving further simplification and reduction in parts.

In an embodiment, the nozzle comprises exactly two struts. The two struts may be arranged approximately in a plane. In such case, such plane defines a lateral direction, wherein the radial direction is identical to the lateral direction. However, more than two struts may be implemented.

In case of exactly two struts, the connection of one of the struts to the nozzle wall may be realized in an inboard area of the nozzle located adjacent an aircraft fuselage and the connection of the other strut to the nozzle wall may be realized at an outboard area of the nozzle located remote to the aircraft fuselage.

The exhaust nozzle may be a convergent-divergent nozzle, wherein the cross-section of the nozzle first decreases in the downstream direction towards a nozzle throat area (usually referred to as A8) and subsequently increases until it reaches the nozzle exit area (usually referred to as A9). By translating the centerbody relative to the outer nozzle wall, the degree of expansion of the flow channel behind the nozzle throat area, i.e. the ratio of A9 to A8, can be adjusted.

According to an embodiment, the nozzle is configured as the nozzle of a supersonic gas turbine engine which is designed for operating conditions in the subsonic, transonic and supersonic ranges.

It should be noted that, when referring to a movement in the axial direction, the movement can be both in the axial direction and against the axial direction, i.e., back and forth.

It should further be noted that the present invention is described in terms of a cylindrical coordinate system having the coordinates x, r and φ. Here x indicates the axial direction, r the radial direction and φ the angle in the circumferential direction. The axial direction is defined by the machine axis/engine centerline of the gas turbine engine, with the axial direction pointing from the engine inlet to the engine outlet. The axial direction of the gas turbine engine is at least substantially identical with the axial direction of the exhaust nozzle of the gas turbine engine. Starting from the x-axis, the radial direction points radially outwards. Terms such as "in front of" and "behind" refer to the axial direction or flow direction in the engine. Terms such as "outer" or "inner" refer to the radial direction.

The invention will be explained in more detail on the basis of exemplary embodiments with reference to the accompanying drawings in which.

Figure 1:
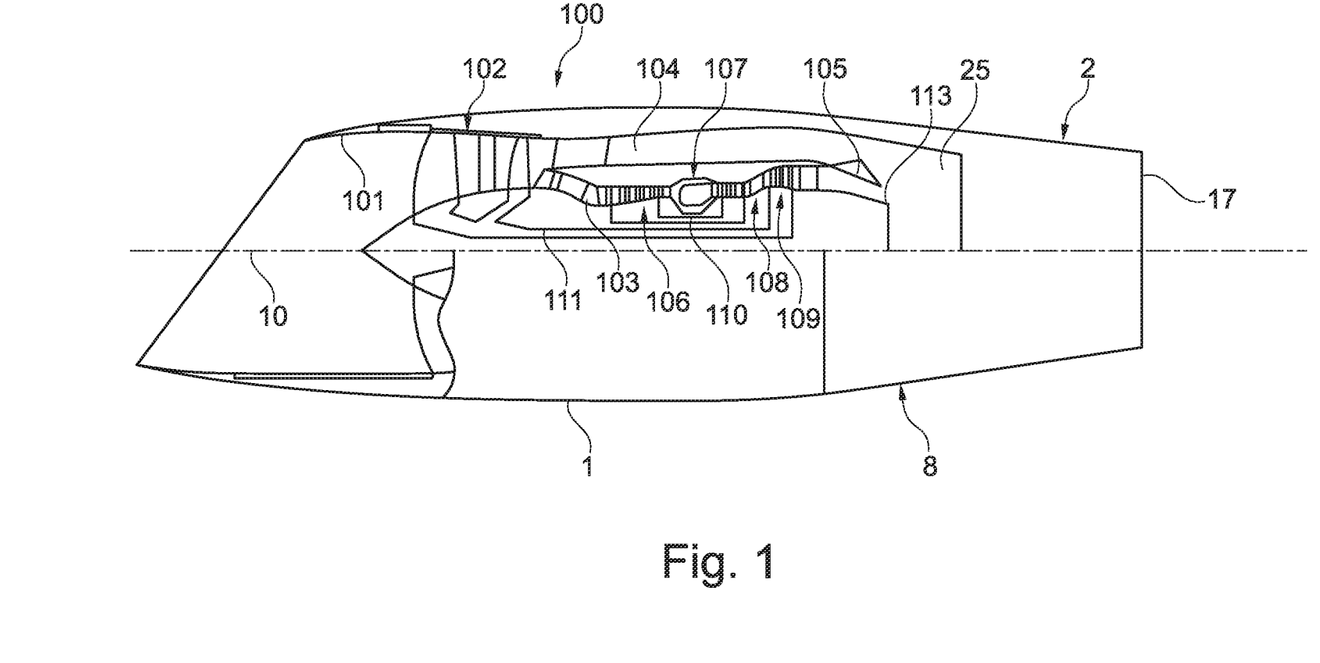
FIG. 1 is a schematic sectional side view of a supersonic gas turbine engine.

FIG. 1 shows a turbofan engine which is intended and suitable for use in a civil or military supersonic aircraft and, accordingly, is designed for operating conditions in the subsonic, transonic and supersonic ranges. However, it should be noted that the principles of this invention can also be implemented in a turbofan engine designed for subsonic operation only. The description of the invention in the context of an engine intended for a supersonic aircraft is therefore only to be understood as an example.

The turbofan engine 100 comprises an engine intake 101, a fan 102 which may be a multi-stage fan, a primary flow channel 103 which passes through a core engine, a secondary flow channel 104 which bypasses the core engine, a mixer 105 and a nozzle 2 in which a thrust reverser 8 can be integrated.

The turbofan engine 100 has a machine axis or engine centerline 10. The machine axis 10 defines an axial direction of the turbofan engine. A radial direction of the turbofan engine is perpendicular to the axial direction.

The core engine comprises a compressor 106, a combustion chamber 107 and a turbine 108, 109. In the example shown, the compressor comprises a high-pressure compressor 106. A low-pressure compressor is formed by the areas close to the hub of the fan 102. The turbine behind the combustion chamber 107 comprises a high-pressure turbine 108 and a low-pressure turbine 109. The high-pressure turbine 108 drives a high-pressure shaft 110 which connects the high-pressure turbine 108 with the high-pressure compressor 106. The low-pressure turbine 109 drives a low-pressure shaft 111 which connects the low-pressure turbine 109 with the multi-stage fan 102. According to an alternative design, the turbofan engine may also have a medium-pressure compressor, a medium-pressure turbine and a medium-pressure shaft. Furthermore, in an alternative design it can be provided that the fan 102 is coupled to the low-pressure shaft 111 via a reduction gearbox, e.g., a planetary gearbox.

The turbofan engine is arranged in an engine nacelle 1. The engine nacelle 1 may be connected to the aircraft fuselage via a pylon.

The engine intake 101 forms a supersonic air intake and is, therefore, designed and suitable for decelerating the incoming air to velocities below Ma 1.0 (Ma=Mach number). The engine inlet is beveled in FIG. 1, with the lower edge protruding from the upper edge, but other kinds of supersonic intakes may be implemented instead.

The flow channel through the fan 102 is divided behind the fan 102 into the primary flow channel 103 and the secondary flow channel 104. The secondary flow channel 104 is also referred to as the bypass channel.

Behind the core engine, the primary flow in the primary flow channel 103 and the secondary flow in the secondary flow channel 104 are mixed by the mixer 105. Furthermore, an outlet cone 113 is mounted behind the turbine in order to achieve desired cross-sections of the flow channel.

The rear area of the turbofan engine is formed by an integral nozzle 2, where the primary and secondary flows are mixed in the mixer 105 before being fed into the integral nozzle 2. The engine behind mixer 105 forms a flow channel 25, which extends through nozzle 2. Alternatively, separate nozzles can be provided for the primary flow channel 103 and the secondary flow channel 104 meaning that the flow through the secondary flow channel 104 has its own nozzle that is separate to and radially outside the core engine nozzle. One or both nozzles (whether mixed or split flow) may have a fixed or variable area.

Figure 2:
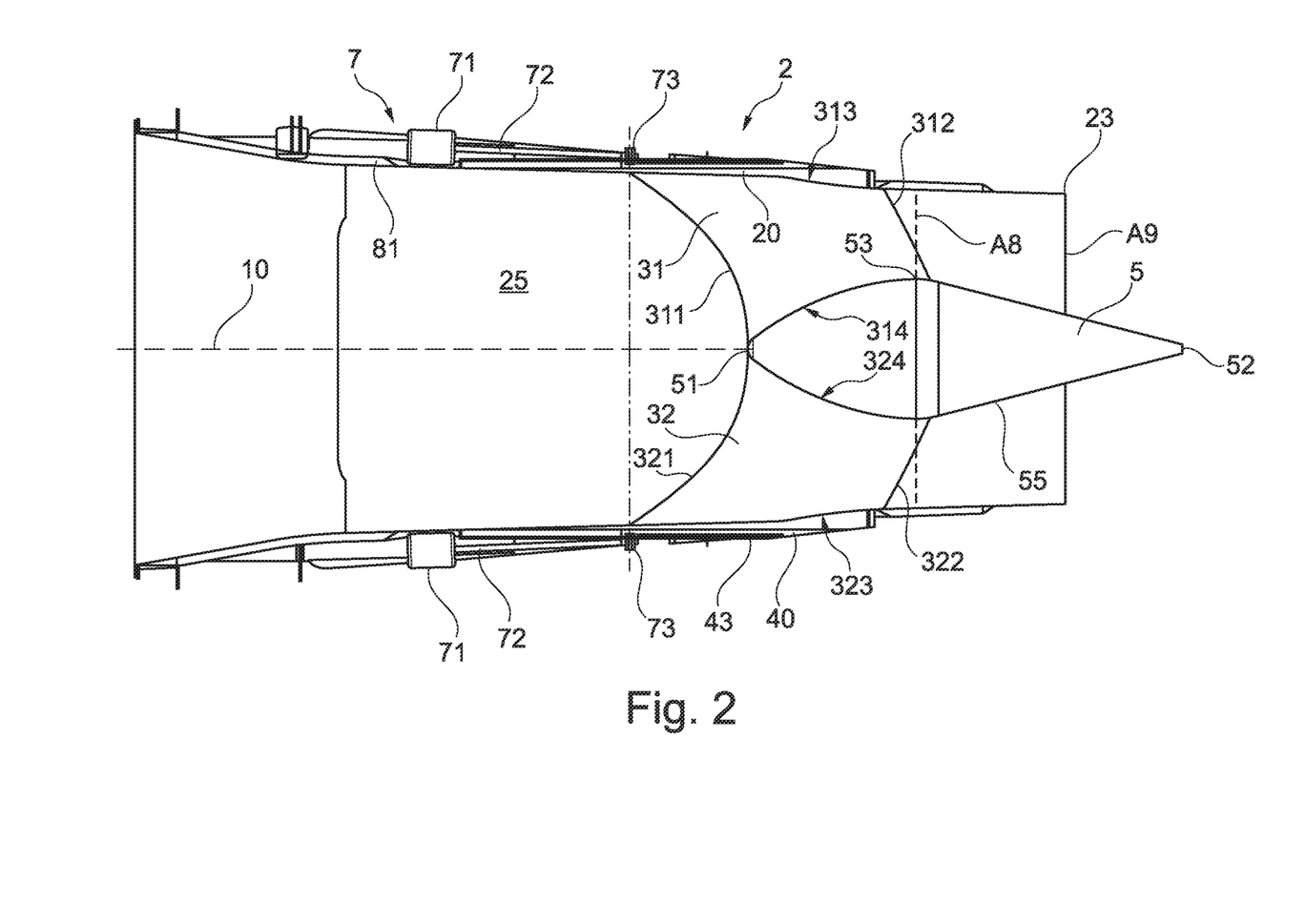
FIG. 2 is a sectional view of an embodiment of an exhaust nozzle that comprises a centerbody, two struts connecting the centerbody to an outer nozzle wall, two actuators each comprising a worm screw, and two toothed racks, each toothed rack formed by a sliding element of the strut and associated with an actuator.

In the context of this invention, the design of the nozzle 2 is of relevance. FIG. 2 shows schematically the basic design of the nozzle 2 in a sectional view that contains the engine centerline 10. Nozzle 2 comprises an outer nozzle wall 20 which forms the radially outer boundary of a flow channel 25 through the nozzle 2. The nozzle 2 further includes a centerbody 5, which forms a surface 55. The centerbody 5 has a longitudinal axis identical to the engine centerline 10. The centerbody 5 forms an upstream end 51, a downstream end 52 and a maximum 53 of its cross-sectional area between the upstream end 51 and the downstream end 52. In the example shown, but not necessarily, the centerbody 5 is conical adjacent to its downstream end 52.

The nozzle 2 forms a nozzle throat area A8 where the cross-sectional area between centerbody 5 and nozzle wall 20 is minimum. Typically, the axial position of the nozzle throat area A8 is defined by the axial position of the maximum 53 of the centerbody 5. However, this is not necessarily the case. At the nozzle exit edge 23, the thrust nozzle forms a nozzle exit area A9. The ratio A9 to A8 defines the degree of expansion of the flow channel 25 behind the nozzle throat area A8.

The nozzle 2 further comprises two struts 31, 32 connecting the centerbody 5 to the nozzle wall 20. They extend from the centerbody 5 in a radial direction through the flow channel 25 to the nozzle wall 20. The struts 31, 32 each have a profile with a front edge 311, 321 and a rear edge 312, 322, as well as an upper side and a lower side. Each strut 31, 32 has a radially outer end 313, 323 at which it is connected to the nozzle wall 20 and a radially inner end 314, 324 at which it is connected to the centerbody 5.

The struts 31, 32 are approximately arranged in a plane containing the engine centerline 10. An arrangement of the struts "approximately" in a plane exists insofar as the struts have a three-dimensional extension corresponding to the profile they form. Furthermore, in embodiments, it may be provided that the two struts 31, 32 are arranged at an angle to each other.

The centerbody 5 is fixed to the struts 31, 32. The struts 31, 32 can be displaced relative to the outer nozzle wall 20. The centerbody 5 may be a modulated centerbody, the cross-section of which varies along the axial direction, wherein the cross-section may have one or several maxima.

For axial movement of the struts 31, 32, each strut 31, 32 comprises a sliding element 40 which forms at its radially outer end a toothing 43 which interacts with an actuator 7. More particularly, the actuator 7 comprises an electric motor 71, a driving rod 72 and a worm screw 73 that meshes with the toothing 43. The actuator 7 is located at a side beam 81 which forms part of a thrust reverser unit that is integrated in the nozzle 2.

Figure 3:
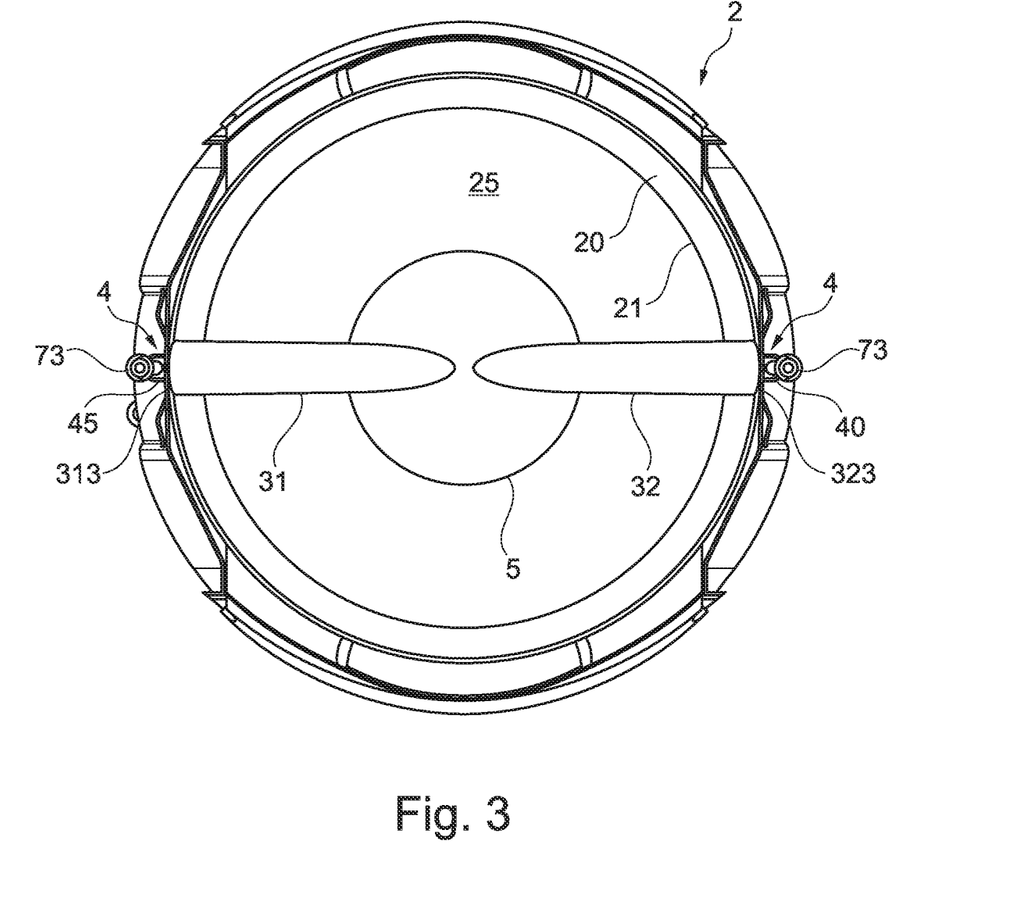
FIG. 3 is a cross-sectional view of the exhaust nozzle of FIG. 2 along the lines B-B of FIG. 2.

FIG. 3 is a cross-sectional view along line B-B of FIG. 2. It shows in front view the centerbody 5 which is connected by means of the struts 31, 32 to the outer nozzle wall 20, wherein the outer nozzle wall 20 comprises an inner wall 21. The nozzle wall 20 has a circular cross-section. The centerbody 5 is located at the centerline of the nozzle 2. The flow channel 25 through the nozzle to is limited radially outwards by the nozzle wall 20 which comprises an inner wall 21.

The struts 31, 32 are connected by means of connections 4 to the nozzle wall 20. The connections 4 are each formed by the sliding element 40 and a receiving slot 45 which both extend in the axial direction, wherein the receiving slot 45 is formed in the nozzle wall 20. The sliding elements 40 each extend radially from the radially outer end 313, 323 of the struts 31, 32 and are located in a form-fit manner in the respective receiving slot 45. Such form-fit connection constrains movement of the sliding element 40 and thus of the strut 31 both in the radial direction and in the circumferential direction. However, a relative movement in the axial direction is enabled.

The corresponding forms of the sliding element 40 and of the receiving slot 45 shown in FIG. 3 are to be understand as an example only. Other corresponding forms which allow for an axial movement may be implemented instead. Generally, the sliding element 40 and the receiving slot 45 may comprise corresponding key-hole sliding profiles.

For axial movement of the struts 31, 32, the actuator 7 applies a driving force to the toothing 43 (see FIG. 2) that is integrated into the sliding element 40, as is further discussed with reference to FIG. 4 which shows the connection of the left hand strut 31 of FIG. 3 to the nozzle wall 20.

Figure 4:
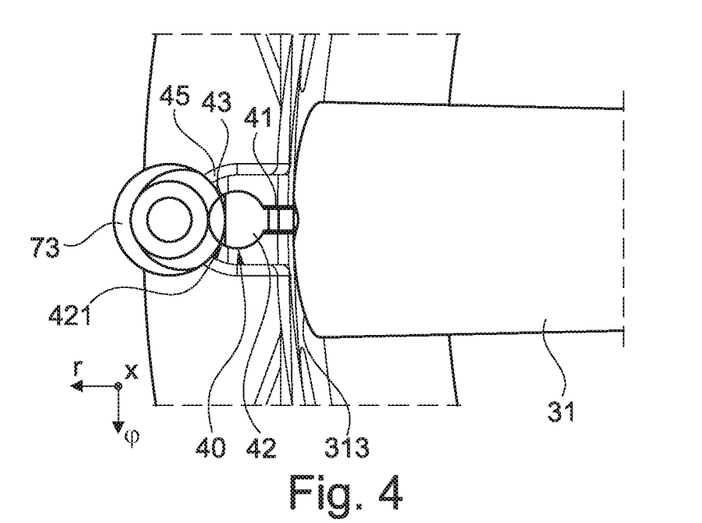
FIG. 4 is an enlarged front view of the worm screw and the toothed rack of FIG. 3.

As shown in FIG. 4, the sliding element 40 is an elongated element extending in the axial direction. It comprises a bridge 41 directly connected to the radially outer end 313 of strut 31 and a cylindrical element 42 which is arranged in the receiving slot 45. The receiving slot 45 is formed by a wall element that is a part of the beam 81 (see FIG. 2) which forms part of the thrust reverser unit that is integrated into the nozzle 2.

The cylindrical element 42 comprises a radial outer section 421 which forms the toothing 43 which is implemented as a toothed rack. The teeth of the toothed rack run substantially in the circumferential direction $\varphi$ in the depicted embodiment, but not necessarily.

The worm screw 73 and the toothing 43 form a worm and rack drive. The actuator 7 may further comprise one or several joints (not shown) which allow the worm screw 73 to tilt with respect to the driving rod 72. The driving rod 72 may be formed by a flexible shaft alternatively. By rotating the worm screw 73, a linear movement of the sliding element 40 and, accordingly, of the strut 31 is effected, wherein the sliding element 40 is displaced in or against the axial direction depending on the direction of rotation of the worm screw 73.

It is pointed out that the provision of the toothing 43 in a cylindrical part 42 of the sliding element 40 is to be understood as exemplary only. Generally, the part of the sliding element 40 which forms the toothing 43 may have other forms.

It is pointed out that in the embodiment of FIGS. 3 and 4 the connection between one strut 31 to the nozzle wall 20 and the connection of the other strut 32 to the nozzle wall 20 are identical. However, this is not necessarily the case. For example, it may be provided that one of the struts is connected to the nozzle wall in a manner that allows movement of the strut relative to the nozzle wall in the radial direction to avoid the buildup of thermal stresses caused by different thermal expansion of the struts, the centerbody and the outer nozzle wall.

Figure 5:
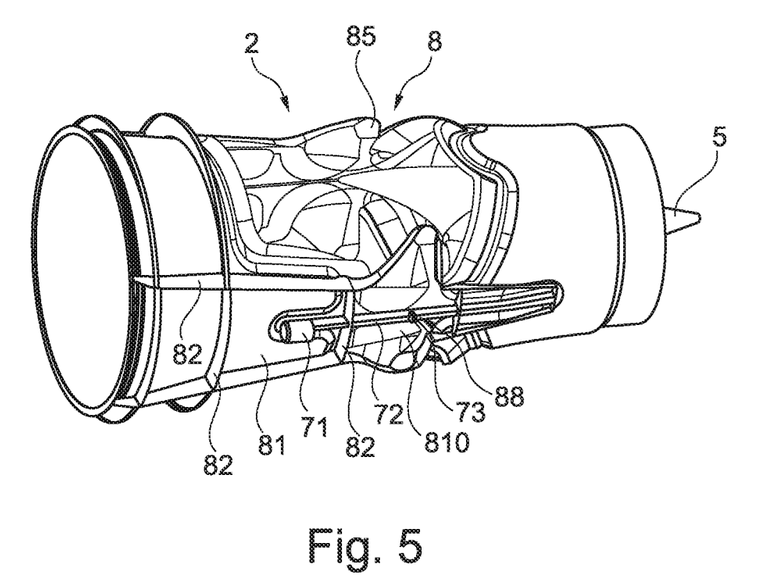
FIG. 5 is a perspective side view of the exhaust nozzle of FIG. 2, wherein an actuator is shown that is integrated into a side beam which is part of a structure that forms a thrust reverser unit.

It will be next discussed with respect to FIGS. 5 to 8 the integration of the actuator 7 and of the interaction between the sliding element 40 and the actuator 7 into the side beams 81 of the nozzle 2. FIG. 5 shows in a perspective side view the static structure of the nozzle 2 of FIGS. 2 to 4. The nozzle wall 20 is only partly shown. The nozzle wall 20 comprises structurally enhanced side structures in the form of the side beams 81 extending axially which are structurally enhanced by means of bars 82 which run in the axial or circumferential direction. The side beams 81 form areas 85 at which hinges (not shown) are located around which the pivot doors (not shown) of the thrust reverser unit rotate when the thrust reversal is actuated.

It is provided that the elements of the actuator, namely, the motor 71, the driving rod 72 and the worm screw 73 are integrated into the side beam 81, which means that they are attached at the outside of a wall 810 of the side beam 81 and/or located in openings or free spaces provided for by different wall parts of the side beam 81. To allow for an interaction between the worm screw 73 and the toothing 43 of the sliding element 40, a slot 88 is provided in the beam wall 810, wherein the worm screw 73 protrudes through the slot 88 towards the toothing 43.

Figure 6:
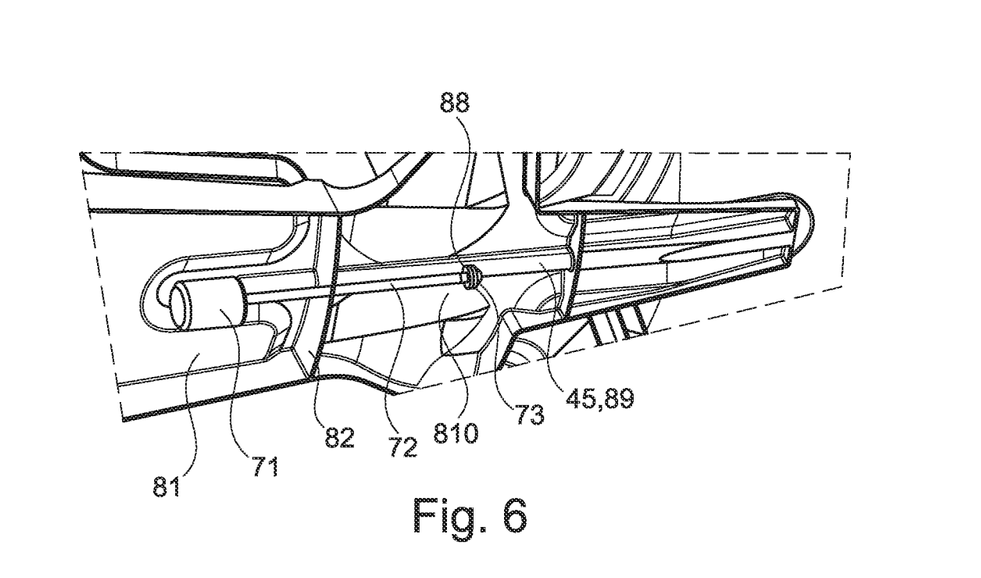
FIG. 6 is an enlarged view of the actuator and the side beam in which the actuator is arranged of FIG. 5.

This is shown in more detail in FIG. 6 which is an enlarged view of the side beam 81 and the actuator elements 71, 72, 73 integrated into the side beam 83. The worm screw 73 protrudes through the slot 88 to interact with the toothing 43. The slot 88 can be of small size as it can be limited to the length of the worm screw. The slot 88 may be sealed to avoid leakage of air.

FIG. 6 also shows from the outside a convex wall section 89 that forms the receiving slot 45. The wall section 89 is formed in the beam wall 810 and is part of the beam wall 810. In this wall section 89, the slot 88 is formed through which worm screw 73 protrudes to interact with the toothing 43.

Figure 7:
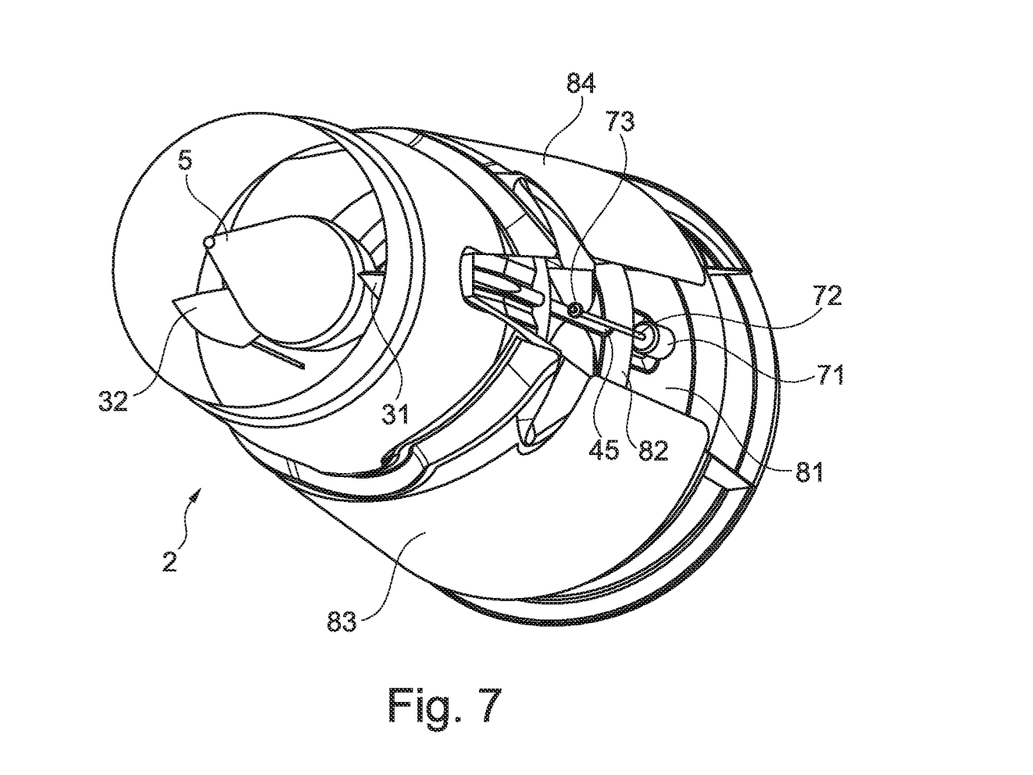
FIG. 7 is a rear perspective view of the exhaust nozzle of FIG. 2.
Figure 8:
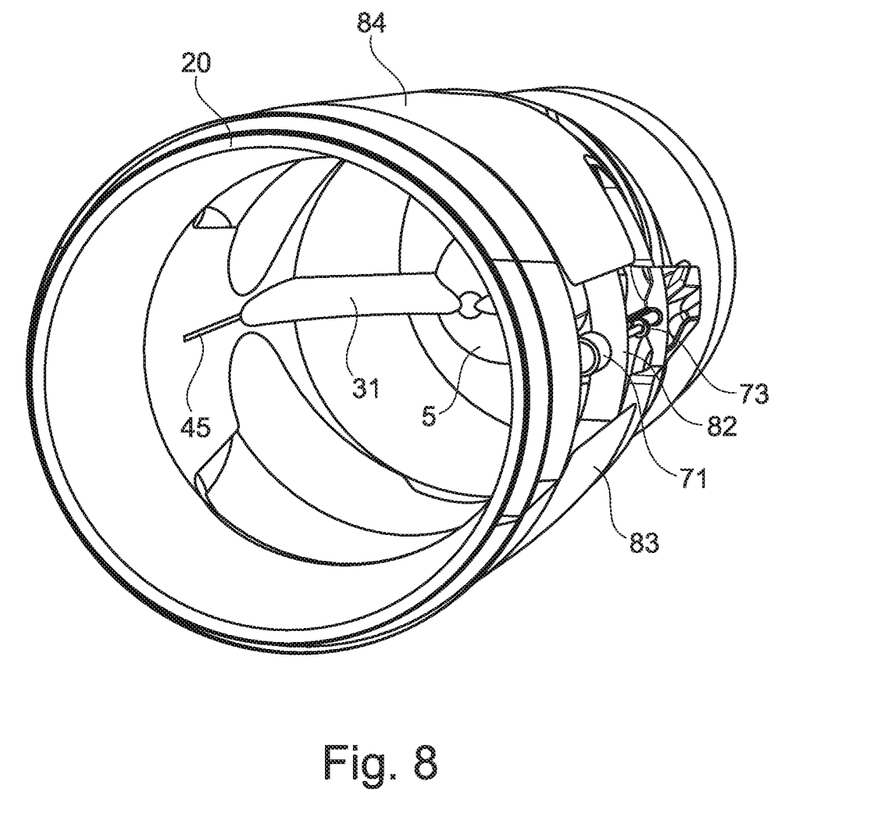
FIG. 8 is a front perspective view of the exhaust nozzle of FIG. 2.

FIGS. 7 and 8 are three-dimensional depictions of the nozzle of FIGS. 2 to 5. They additionally show pivot doors 83, 84 which can be opened to block the flow channel 25 when the thrust reverser unit is actuated. The pivot doors 83, 84, however, do not interfere with the actuating mechanism for moving the struts 31, 32 in the axial direction. In FIG. 8, the receiving slot 45 formed in the nozzle wall 20 can be well seen.

Figure 9:
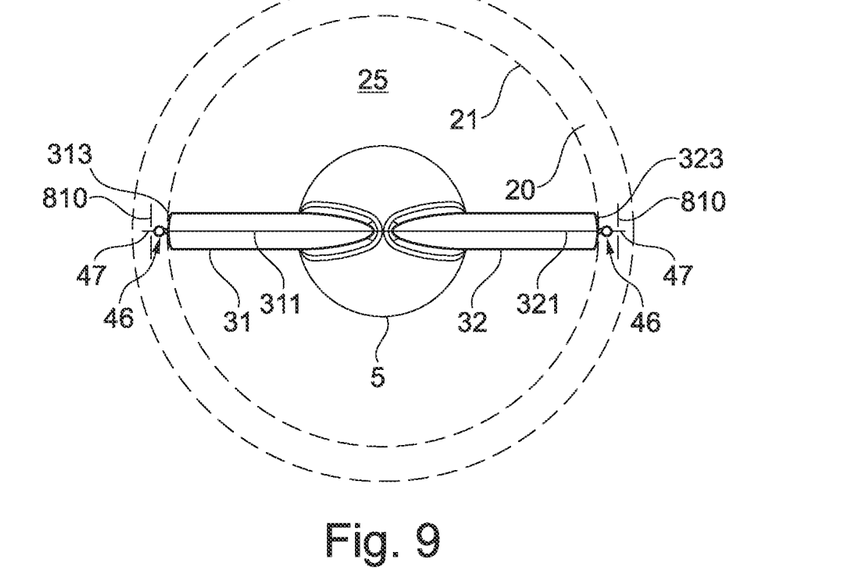
FIG. 9 is a sectional view of a further embodiment of an exhaust nozzle that comprises a centerbody and two struts connecting the centerbody to an outer nozzle wall, wherein for each strut a linear actuator is provided that is connected to lugs of a sliding element of the strut.
Figure 10:
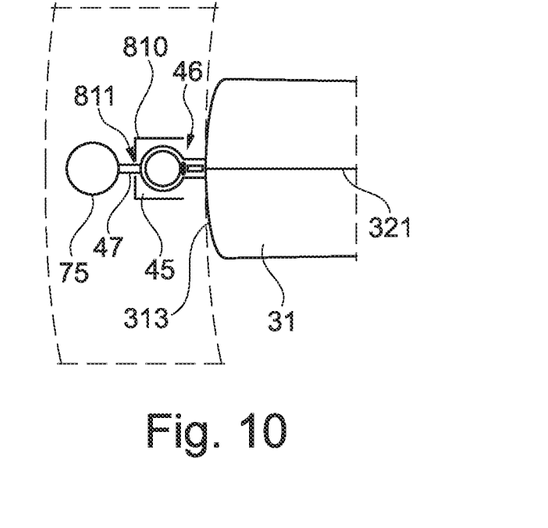
FIG. 10 is an enlarged view of the linear actuator and the sliding element of FIG. 9.

FIGS. 9 and 10 show an alternative embodiment which differs from the embodiment of FIGS. 2 to 8 in that the actuator is not a rotational actuator which translates its rotational movement through a warm and rack drive to a linear movement of the sliding element 40, but instead a linear actuator. As shown in FIG. 9, the general design is the same, wherein a centerbody 5 is connected by two struts 31, 32 to a nozzle wall 20 that comprises an inner wall 21. The struts 31, 32 have respective front edges 311, 321. Each strut 31, 32 comprises a sliding element 46 which extends radially from the radial outer end 313, 323 of the struts 31, 32. The sliding element 46 is arranged in a receiving slot from which only a wall section 810 is shown in FIG. 9, wherein the wall section 810 is part of the side beam of the nozzle 2, similar as in the embodiment of FIGS. 2 to 8.

There are provided lugs 47 which are connected to the sliding element 46 and which protrude in the radial direction through a slot 811 in the wall 810. The lugs 47 are firmly connected to a linear actuator. This is shown in more detail in FIG. 10.

According to FIG. 10, the lugs 47 connected to the sliding element 46 extend through a slot 811 in the wall 810 that defines the receiving slot 45 in which the sliding element 46 is arranged. The lugs 47 are firmly connected to an element 75 of a linear actuator that may be an electrical, diplomatic or hydraulic linear actuator. The element 75 is moved in the longitudinal direction by the actuator. With the lugs 47 being firmly connected to the element 75, linear movement of the element 75 provides for an axial movement of the sliding element 46 and thus of struts 31. A similar drive arrangement is implemented at the other strut 32.

There may be provided a plurality of lugs 47 which connect the sliding element 46 with the element 75 of the linear actuator along the axial length of the sliding element 46.

In such embodiment, the slot 811 extends in the axial direction. An additional sealing may be provided for which reduces leakage air to pass through the slot 811.

In further embodiments, there are provided more than two struts, such as three, four or five struts, to connect the centerbody 5 to the nozzle wall 20, wherein all of the struts are connected to the nozzle wall 20 in the manner discussed above.

It should be understood that the above description is intended for illustrative purposes only and is not intended to limit the scope of the present disclosure in any way. Also, those skilled in the art will appreciate that other aspects of the disclosure can be obtained from a study of the drawings, the disclosure and the appended claims. All methods described herein can be performed in any suitable order unless otherwise indicated herein or otherwise clearly contradicted by context. Various features of the various embodiments disclosed herein can be combined in different combinations to create new embodiments within the scope of the present disclosure. In particular, the disclosure extends to and includes all combinations and sub-combinations of one or more features described herein. Any ranges given herein include any and all specific values within the range and any and all sub-ranges within the given range.

The invention claimed is:

1. An exhaust nozzle of a gas turbine engine, wherein the exhaust nozzle comprises:
   an outer nozzle wall,
   a flow channel which is limited radially outwards by the outer nozzle wall,
   a centerbody arranged in the flow channel,
   struts connecting the centerbody to the outer nozzle wall,
   a thrust reverser unit,
   actuators, wherein the actuators are respectively connected to the struts for displacing the struts in an axial direction,
   wherein the struts are connected to a structure of the outer nozzle wall that forms part of the thrust reverser unit,
   wherein, for allowing axial relative movement between the struts and the outer nozzle wall, each of the struts comprises a sliding member having an elongated shape along an axis of extension thereof, the sliding member extending radially from a radial outer end of the each of the struts, wherein the sliding member is shaped to be positioned in a receiving slot that extends in the axial direction in the outer nozzle wall, and
   wherein the sliding member comprises an interaction structure that interacts with one of the actuators for providing relative axial movement between the each of the struts and the outer nozzle wall.

2. The exhaust nozzle of claim 1, wherein the interaction structure includes a toothing integrated into the sliding member, wherein the one of the actuators interacts with the toothing for axial movement of the each of the struts.

3. The exhaust nozzle of claim 2, wherein the toothing forms a toothed rack in the sliding member.

4. The exhaust nozzle of claim 3, wherein the toothed rack comprises teeth formed substantially in a circumferential direction of the sliding member.

5. The exhaust nozzle of claim 2, wherein the one of the actuators comprises a worm screw that interacts with the toothing of the sliding member.

6. The exhaust nozzle of claim 5, wherein the one of the actuators and the toothing of the sliding member form a worm and rack drive.

7. The exhaust nozzle of claim 1, wherein the sliding member comprises a radial outer section, wherein the toothing is formed in the radial outer section of the sliding member.

8. The exhaust nozzle of claim 7, wherein the radial outer section of the sliding member is formed as a cylinder, wherein the toothing is formed in a radial outer side of the cylinder.

9. The exhaust nozzle of claim 1, wherein the sliding member and the receiving slot comprise, in cross section, corresponding keyhole shapes.

10. The exhaust nozzle of claim 1, wherein the sliding member is form-fitted in radial and circumferential directions to the receiving slot.

11. The exhaust nozzle of claim 1, wherein the structure of the outer nozzle wall that forms part of the thrust reverser unit and to which the struts are connected comprises beams, wherein at least parts of each of the actuators are located at a respective one of the beams.

12. The exhaust nozzle of claim 11, wherein each of the beams comprises a beam wall and a slot in the beam wall, wherein an interacting element of the each of the actuators and/or at least a portion of the interaction structure of the sliding member protrudes through the slot in the beam wall for interaction between the each of the actuators and the sliding member.

13. The exhaust nozzle of claim 12, wherein the interaction structure includes a toothing integrated into the sliding member, wherein the each of the actuators comprises a worm screw and wherein the worm screw protrudes through the slot in the beam wall to interact with the toothing of the sliding member.

14. The exhaust nozzle of claim 12, wherein the interaction structure is formed by lugs protruding from the sliding member through the slot in the beam wall, wherein the each of the actuators is a linear actuator, and wherein the lugs are connected to the linear actuator.

15. The exhaust nozzle of claim 11, wherein the receiving slot is formed by a wall section of the beam.

16. The exhaust nozzle of claim 11, wherein the thrust reverser unit comprises pivot doors which block the flow channel when the thrust reverser unit is activated, wherein the pivot doors are hinged to the beams.

17. The exhaust nozzle of claim 1, wherein the exhaust nozzle comprises exactly two struts and wherein the connection of one of the exactly two struts to the outer nozzle wall is in an inboard area of the exhaust nozzle located adjacent an aircraft fuselage and the connection of the other of the exactly two struts to the outer nozzle wall is at an outboard area of the exhaust nozzle located remote to the aircraft fuselage.

18. The exhaust nozzle of claim 17, wherein the two struts are arranged approximately in a plane.

19. The exhaust nozzle of claim 1, wherein the exhaust nozzle has a convergent-divergent cross-section.

20. The exhaust nozzle of claim 1, wherein the exhaust nozzle is configured as the exhaust nozzle of a supersonic gas turbine engine.

* * * * *